United States Patent
Cannell et al.

(10) Patent No.: US 6,574,384 B1
(45) Date of Patent: Jun. 3, 2003

(54) TESTING OPERATION OF A PHOTONIC SWITCH

(75) Inventors: George Cannell, Bishops Stortford (GB); Adrian Sparks, Ongar (GB)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/545,545

(22) Filed: Apr. 7, 2000

(51) Int. Cl.$^7$ ................................................ G02B 6/26
(52) U.S. Cl. ............................ 385/16; 385/17; 385/18
(58) Field of Search ............... 385/16–18, 24; 359/872–873

(56) References Cited

U.S. PATENT DOCUMENTS

| | | | |
|---|---|---|---|
| 4,988,157 A | 1/1991 | Jackel et al. | |
| 5,732,168 A | 3/1998 | Donald | |
| 5,982,554 A | * 11/1999 | Golstein et al. | 359/629 |
| 6,198,856 B1 | * 3/2001 | Schroeder et al. | 385/17 |

FOREIGN PATENT DOCUMENTS

EP 1 045 265 A2 10/2000

OTHER PUBLICATIONS

"Free—Space Micro Machined Optical Switches for Optical Networking" by Ly Lin et al, IEEE Journal of selected topics in Quantum Electronics vol. 5 No. 1. Jan./Feb. 1999.

Micromachined Optical Cross Connects with Integrated Signal–Monitoring Functionality OFC/I00C '99 pp. 128–130 vol. 4.

Lin Y Et Al: "High Density Micromachined Polygon Optical Cross Connects Exploiting Network Connection–Symmetry" IEEE Photonics Technology Letters, US, IEEE Inc. New York, vol. 10, No. 10 Oct. 1, 1998 pp. 1425–1427.

* cited by examiner

Primary Examiner—John Juba, Jr.
Assistant Examiner—Fayez Assaf
(74) Attorney, Agent, or Firm—Barnes & Thornburg

(57) ABSTRACT

A method and apparatus suitable for testing the operation of a photonic switch are described. The photonic switch includes switching means arranged to redirect (and hence switch) an incident optical signal. Operation of the switching means can be verified by providing a test optical signal arranged to be incident upon the switching means, the test optical signal path being distinct from the switched optical signal path.

20 Claims, 5 Drawing Sheets

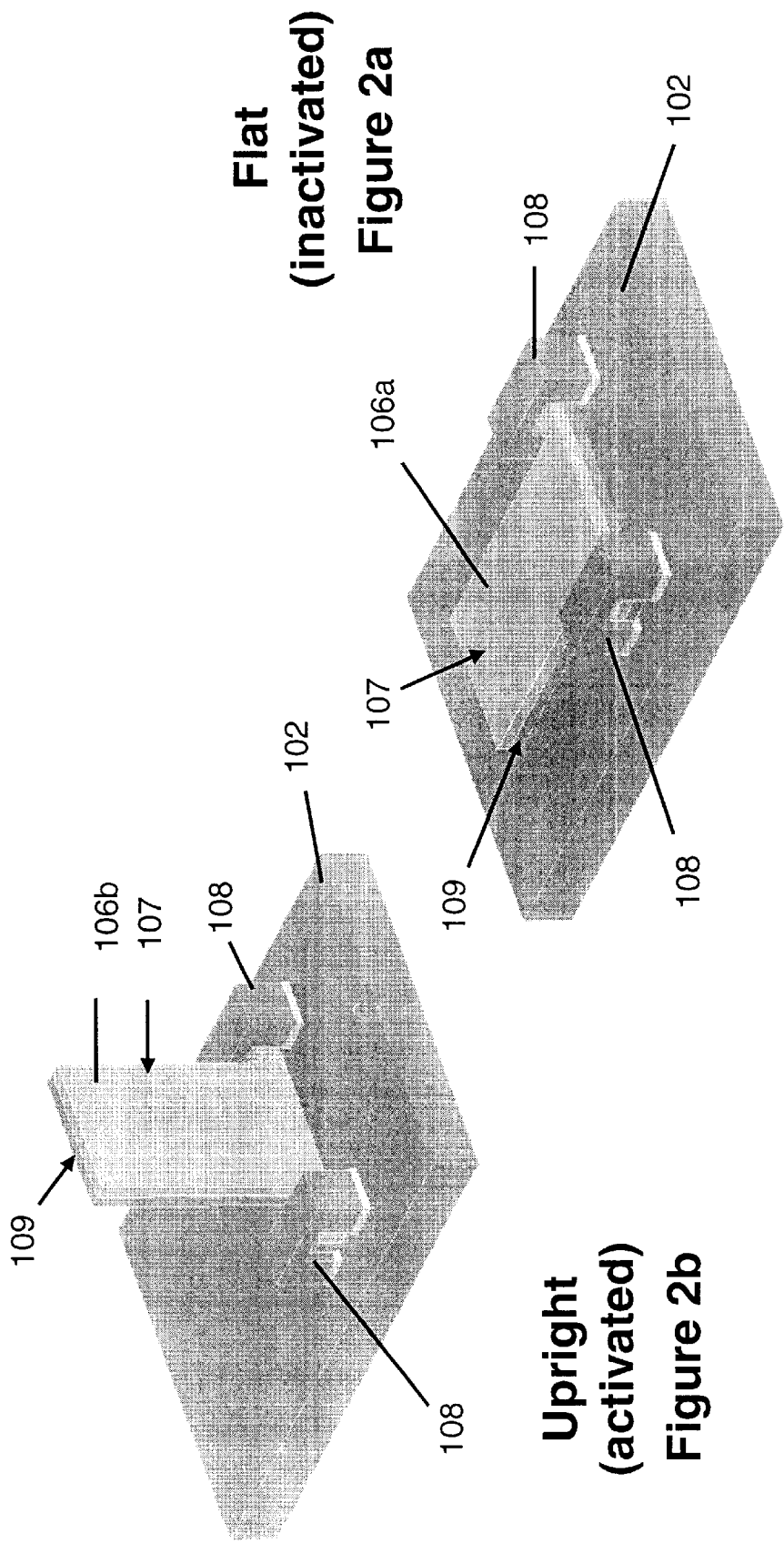

TESTING OPERATION OF A PHOTONIC SWITCH

FIELD OF THE INVENTION

The present invention relates to a photonic switch, and in particular to an apparatus and a method suitable for testing the operation of a photonic switch.

BACKGROUND OF THE INVENTION

Communications networks are increasingly becoming all optical networks, incorporating photonic (optical) switching. Photonic switches are typically fabricated using Micro Electro-Mechanical systems (MEMS) technology. A recently developed photonic switch of this type is described in "Free-Space Micro Machined Optical Switches for Optical Networking" by LY Lin et al, IEEE Journal of Selected Topics in Quantum Electronics, Vol. 5 No. 1, January/February 1999; which is incorporated herein by reference. Such switches may be used to switch wavelength division multiplexed (WDM) signals as a group, or the WDM signals may be demultiplexed outside the switch and switched individually as channels, or as groups of channels as desired. MEMS switches typically use moveable mirrors to re-direct optical paths within the switch in order to complete an optical signal or channel connection across the switch.

FIG. 1 shows a schematic diagram of a typical MEMS photonic switch 100. The switch 100 is bi-directional, but for simplicity is assumed to comprise 4 inputs in the form of optical fibres 112, 114, 116 & 118, and 4 outputs which are also optical fibres 122, 124, 126 & 128. Each input and output has an associated lens 104 which collimates the beam from each input and focuses the respective beam at each output. Such a switch is generically referred to as a 4×4 switch (number of inputs×number of outputs).

The switch 100 is a cross point switch, having a switching device (a mirror, 106) located at each of the points at which optical signals emitted from the input fibres would cross with optical signals emitted from the output fibres. The switch 100 thus has a four by four array of mirrors 106 mounted on a surface 102.

In this particular switch, each mirror may be moved between two stable positions. FIGS. 2a and 2b illustrate these positions. FIG. 2a shows the mirror in the inactivated position 106a, where the mirror is flat, i.e. substantially parallel to the surface 102. FIG. 2b shows the mirror having been raised to the activated or upright position 106b, substantially perpendicular to the surface 102. This activation may be performed by a variety of means e.g. by micro actuators causing the mirror to be rotated about the hinges 108. The mirrors are typically formed of materials such as polysilicon, the reflectivity of which is increased by providing a reflective coating 107 such as gold. In the activated state, it is typical for the relatively non reflective surface 109 of the mirror to lie adjacent to the surface 102, so that the reflective coating 107 does not contact the surface 102.

FIG. 1 shows a typical operation of the switch 100. By raising the appropriate mirrors, an optical signal from each of the inputs 112, 114, 116 & 118 is directed to a respective output 128, 126, 122 & 124. For instance, an optical signal originating from input fibre 112 is formed into a collimated beam 132 by lens 104. The beam 132 then reflects off the front reflective surface 107 of a raised mirror 106b into a further lens 104 which focuses the beam 132 into the output fibre 128. It will be appreciated that by appropriate control of the array of mirrors 106, any one of the signals originating from the inputs 112, 114, 116 & 118 can be switched into any one of the outputs, 122, 124, 126 & 128.

Various solutions have been proposed to test the mirror status or switch connection, in order to verify that the mirrors 106 are functioning correctly and are not, for example, jammed in either the raised 106b or flat 106a position.

One solution is to inject different optical test signals into each input port (i.e. 112, 114, 116, 118) to the switch 100 via fibre tap couplers (not shown). Such test signals would be distinct from the normal optical signal being switched e.g. of different wave length and/or modulation characteristics. Each output port (i.e. 122, 124, 126, 128) would then be connected to a further tap coupler. In order that the test signals could be extracted, detected and analysed for verification that the desired input to output connections exist. This solution is true connectivity verification. However, due to the number of components required, it would be both bulky and expensive. For instance, in a N×N switch (where N is an integer) the required components would include 2N couplers, N sources, N detectors, as well as numerous splices and fibre interfaces; additionally there would be the assembly cost.

An alternative solution is to use electrical parameters (e.g. capacitance, inductance or resistance) to monitor the physical position of the mirrors. However, this would double the number of electrical connections to the switch matrix, and is hence impractical for large arrays of mirrors.

The present invention aims to address such problems.

SUMMARY OF THE INVENTION

In a first aspect, the present invention provides a method of testing the operation of a photonic switch, said switch comprising switching means arranged to be movable between at least a first and a second position, and arranged to switch an incident optical signal by redirection of the optical path of said signal, the method comprising the steps of providing a test optical signal arranged to be incident upon said switching means when in said first position, along a path distinct from the switched optical signal path; and measuring the test signal at a predetermined position suitable for determining if said switching means is in said first position from the measurement. By the term distinct, it is understood that at least a portion of the test optical signal path is different from the switched optical signal path.

Preferably, the method further includes the step of the switching means, when in said first position, redirecting the test optical signal path. Alternatively, the switching means could act to either block (prevent the optical signal reaching a detector) or pass the test signal when in said first position.

Preferably, the redirection occurs as a consequence of at least one of reflection and refraction. Hence a reflective surface such as a mirror or a refractive medium such as glass could be utilised to redirect the signal.

Preferably, the switch comprises a plurality of said switching means, the method steps each being performed a predetermined number of times. For instance, a cross point switch having N inputs and M outputs would have N×M switching means, and it could be desirable to check the operation of some or all of the switching means.

Preferably, the method steps are sequentially repeated.

Preferably, the method steps are performed prior to the switch being utilised to switch live optical signals, the method further comprising the steps of sequentially switching said switching means between said first and said second position. For instance, the steps could be performed in order to test the operation of each of the switching means in a recently installed or manufactured switch. Equally, the steps could be performed in order to test the switch operation after a storage or transportation period, prior to the switch being deployed/installed in a system.

Preferably, the switch further comprises a plurality of further switching means arranged to switch a test optical signal along a plurality of paths, each path being incident upon a switching means when in said first position, the method further comprising the step of utilising said further switching means to sequentially provide a test optical signal incident upon the switching means in a predetermined sequence.

Preferably, the method steps are performed while said switch is carrying live optical signals.

In a further aspect, the present invention provides a computer programme arranged to perform a method of testing the operation of a photonic switch, said switch comprising switching means arranged to be movable between at least a first and a second position, and arranged to switch an incident optical signal by redirection of the optical path of said signal the method comprising the steps of providing a test optical signal arranged to be incident upon said switching means when in said first position, along a path distinct from the switched optical signal path; and measuring the test signal at a predetermined position suitable for determining if said switching means is in said first position from the measurement.

Preferably, the computer programme is stored on a machine readable medium.

In another aspect, the present invention provides a photonic switch comprising switching means arranged to be moveable between at least a first and a second position, and arranged to switch an incident optical signal by redirection of the optical path of said signal, the switch further comprising means to provide a test optical signal incident upon said switching means when in said first position along a path distinct from the switched optical signal, and output means suitable for providing an output for measuring the test signal at a predetermined position suitable for determining if said switching means is in said first position from said measurement.

Preferably, the output means comprises an output port suitable for connection to an optical power meter.

Preferably, the switching means has a first reflective surface for redirection of said incident optical signal.

Preferably, the switching means further comprises a second reflective surface arranged to redirect an incident test optical signal along an optical path to said output. The second surface may be only partially reflective. If desired, the surface reflectance characteristics could be enhanced by the addition of an appropriate coating.

Preferably, the first and second reflective surfaces are substantially parallel.

However, appropriate switch configuration could be utilised where the reflective surfaces are not parallel.

Preferably, the switch further comprises N inputs for providing input optical signals to be switched, M outputs for output of the resultant switched signals, and an array of N×M switching means for switching said optical signals.

Preferably, one of said inputs is arranged to provide a test optical signal, and one of said outputs is arranged to receive said test optical signal.

Preferably, the switch further comprises an additional input for providing said test signal, an additional output for receiving said output test signal, and an additional row and column of switching means for directing said test signal.

Preferably, the switch further comprises control means arranged to perform a method comprising the steps of providing a test optical signal arranged to be incident upon said switching means when in said first position, along a path distinct from the switched optical signal path; and measuring the test signal at a predetermined position suitable for determining if said switching means is in said first position from the measurement.

In a further aspect the present invention provides a telecommunication system comprising a photonic switch comprising switching means arranged to be moveable to at least a first and a second position, and arranged to switch an incident optical signal by redirection of the optical path of said signal, the switch further comprising means to provide a test optical signal incident upon said switching means when in said first position along a path distinct from the switched optical signal, and output means suitable for providing an output for measuring the test signal at a predetermined position suitable for determining if said switching means is in said first position from said measurement.

BRIEF DESCRIPTION OF THE DRAWINGS

In order that a greater understanding of the invention can be obtained, embodiments of the invention will now be described with reference to the accompanying drawings, by way of example only and without intending to be limiting, in which:

FIG. 2a and FIG. 2b show respectively a mirror from the switch of FIG. 1 in the inactivated state and the activates state (PRIOR ART);

DETAILED DESCRIPTION OF PREFERRED EMBODIMENTS

Figure 1:
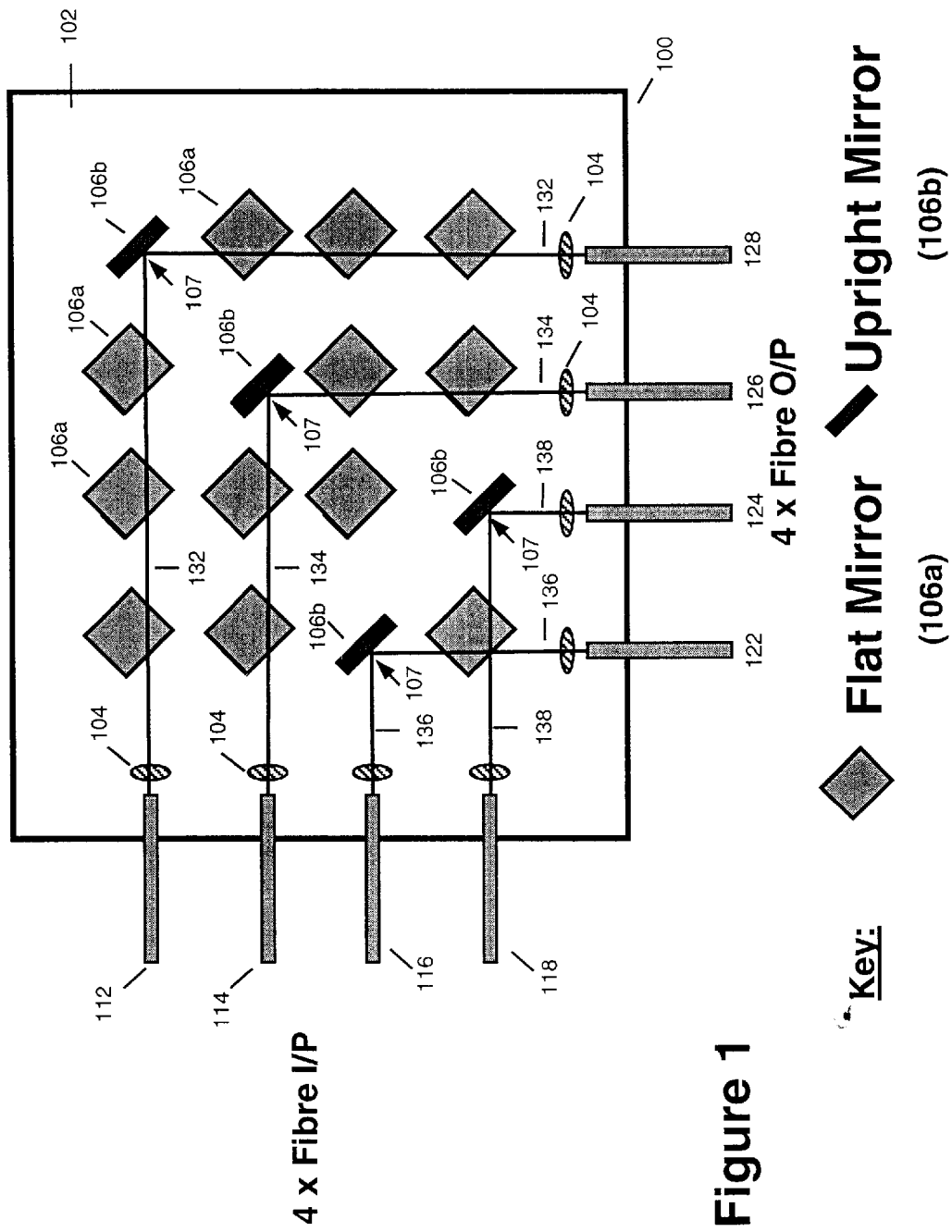
FIG. 1 shows a typical MEMS switch arrangement (PRIOR ART)
Figure 3A:
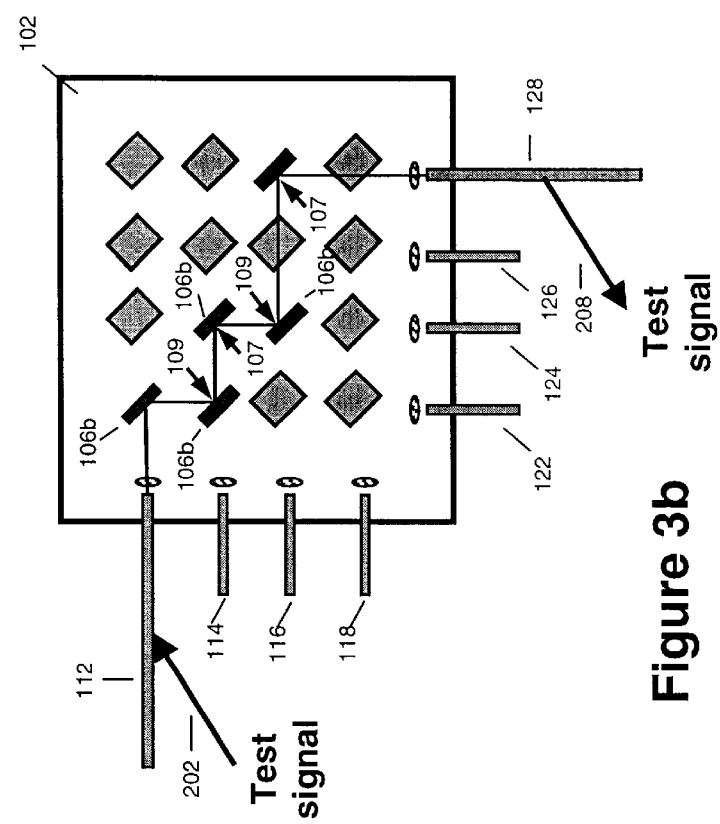
FIGS. 3a and 3b show alternative configurations of the operation of a MEMS switch according to a first embodiment of the present invention.
Figure 3B:
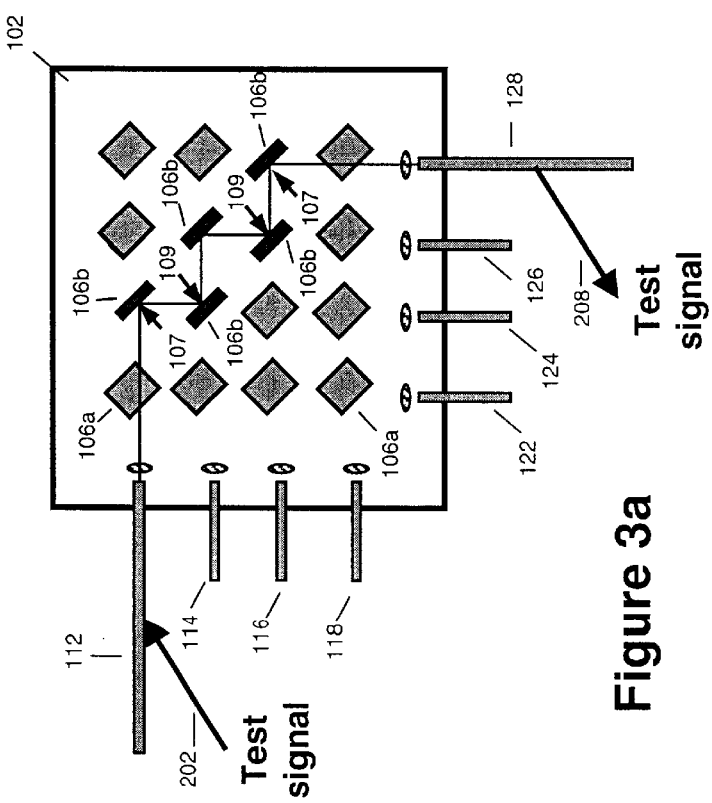

FIGS. 3a and 3b show a first embodiment of the present invention, which largely corresponds to the typical MEMS switch arrangement shown in FIG. 1. By appropriate movement of each of the mirrors 106 between the flat 106a and raised 106b positions, optical signals from each of the inputs 112,114,116 & 118 can be directed to any of the outputs 122,124,126,128. The apparatus is characterised by having a single test signal generating means 202 coupled to an input 112. The generator 202 provides an optical test signal which will enter the switch 102 along the same path as a transmission signal from the input 112.

The switch 102 further comprises a test signal detector 208 coupled to the output 128, and arranged to detect test signals incident upon the output 128. In this particular example, both the test signal generator and the test signal detector are respectively coupled to the fibres 122,128 by a fused fibre coupler. If desired, the test signal can be "out of band" i.e. outside the range of optical wavelengths normally utilised to transmit signals through the switch. Equally, the coupling between the output 128 and the detector 208 maybe wavelength selective e.g. arranged to filter the optical signal of the test signal to the detector, and to pass normal optical transmission signals.

In this particular embodiment, the rear surfaces 109 of the mirrors 106 are at least partially reflective. This has been discovered to be a characteristic of normal MEMS switches with the reflectivity of the surface 109 tending to be lower than the reflectivity of the surface 107 normally used for performing redirection of the optical transmission signal.

In normal operation, a single mirror is utilised to direct the optical signal from an input 112,114,116,118 to a respective output 122,124,126,128. The optical signal is hence normally reflected off the front surface 107 of a single mirror 106 directly to a predetermined output.

As can be seen in FIG. 3a, the test signal can undergo more than one reflection, and may be reflected off both the front 107 and rear 109 surfaces of the upright mirrors 106b in order to reach the detector 208 via the output 128. FIG. 3b shows the same apparatus with the mirrors in an alternative switching configuration i.e. testing the operation of a different set of mirrors. It will be appreciated by appropriate selection of the mirror configurations (i.e. which mirrors are in the upright 106b and flat 106a positions), then the operation of any of the mirrors can be verified.

This embodiment would preferably be utilised to verify the operation of a switch whilst it was not transmitting live information signals. This is due to the fact that certain mirror configurations might act to limit the optical transmission paths of data signals from the inputs to the predetermined outputs, as raising additional mirrors can block an intended optical path. For instance, in the example illustrated by FIG. 3a a normal optical transmission signal from input 114 could not be directed to output 126 as the uppermost raised mirror 106b would instead direct the signal towards the output 124.

Figure 4B:
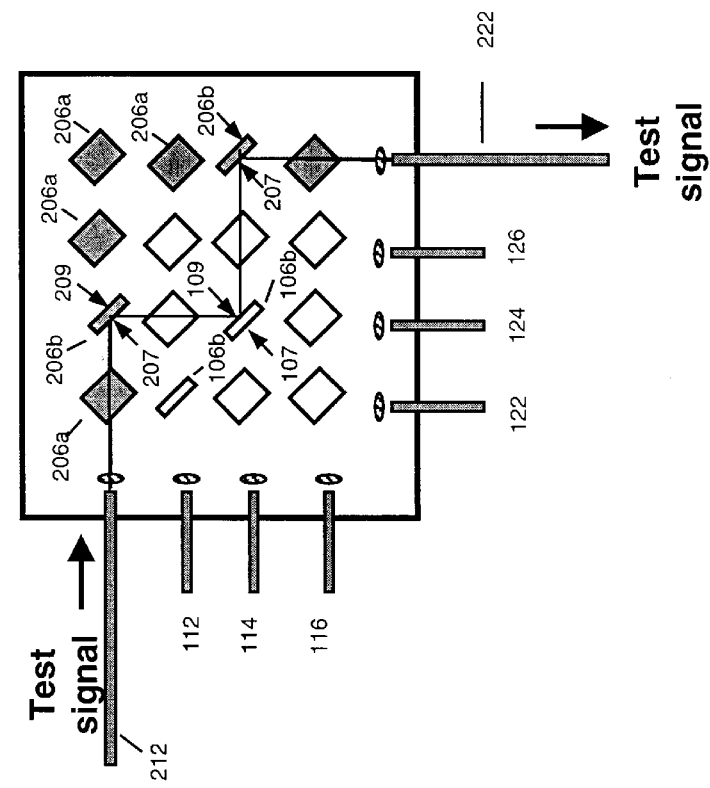
FIGS. 4a and 4b show alternative configurations of a MEMS switch according to a second embodiment of the present invention.
Figure 4A:
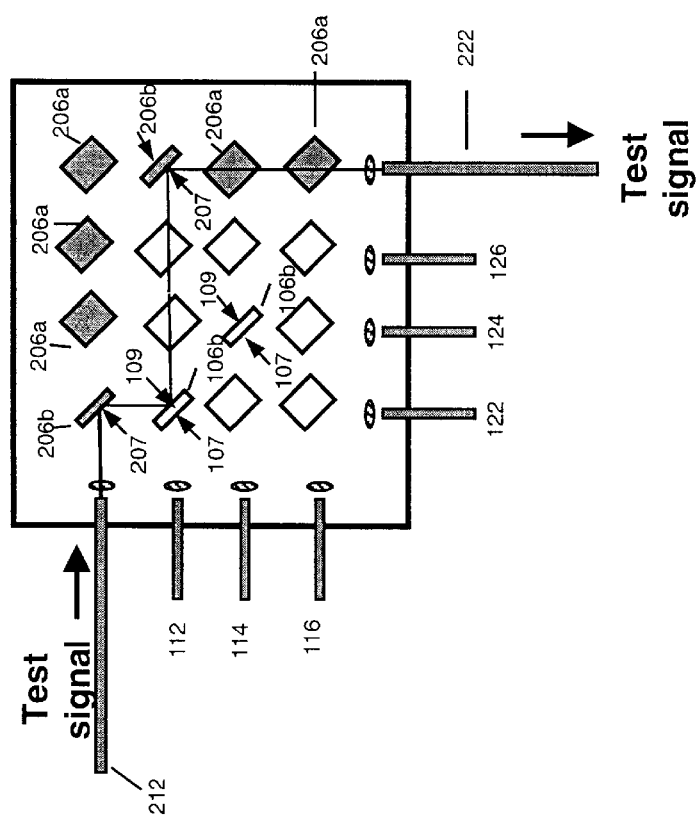

FIGS. 4a and 4b show an alternative photonic switching arrangement in the form of a 3×3 switch. Optical signals from any of the 3 inputs 112,114 & 116 can be directed to any of the 3 outputs 122,124 & 126 by raising any of the appropriate mirrors 106. In addition, the switch comprises a dedicated test signal input 212 and a dedicated test signal output 222, as well as an additional row and column of test signal mirrors 206 which may be either in the raised 206b or the flat 206a position.

During operation, live traffic from any of the inputs 112,114,116 will be directed to any of the outputs 122,124 & 126 by appropriately raising a respective mirror 106. The operation of any of the mirrors 106 can be verified by raising any 2 of the test signal mirrors 206. For instance, in FIG. 4a the mirror 106 used to switch an optical signal from the input 112, to the output 122 is being verified by a test signal from the input 212 reflecting from the front surface 207 of a first raised test mirror 206b, the signal subsequently reflecting off the rear surface 109 of the mirror being tested and hence directed to the front surface 207 of a second raised test signal mirror 206b and hence directed to the output 222 for detection. FIG. 4b shows an alterative configuration of the test signal mirrors in order to verify that the mirror utilised to direct an optical signal from input 114 to output 124 is in the correct upright position.

Figure 5:
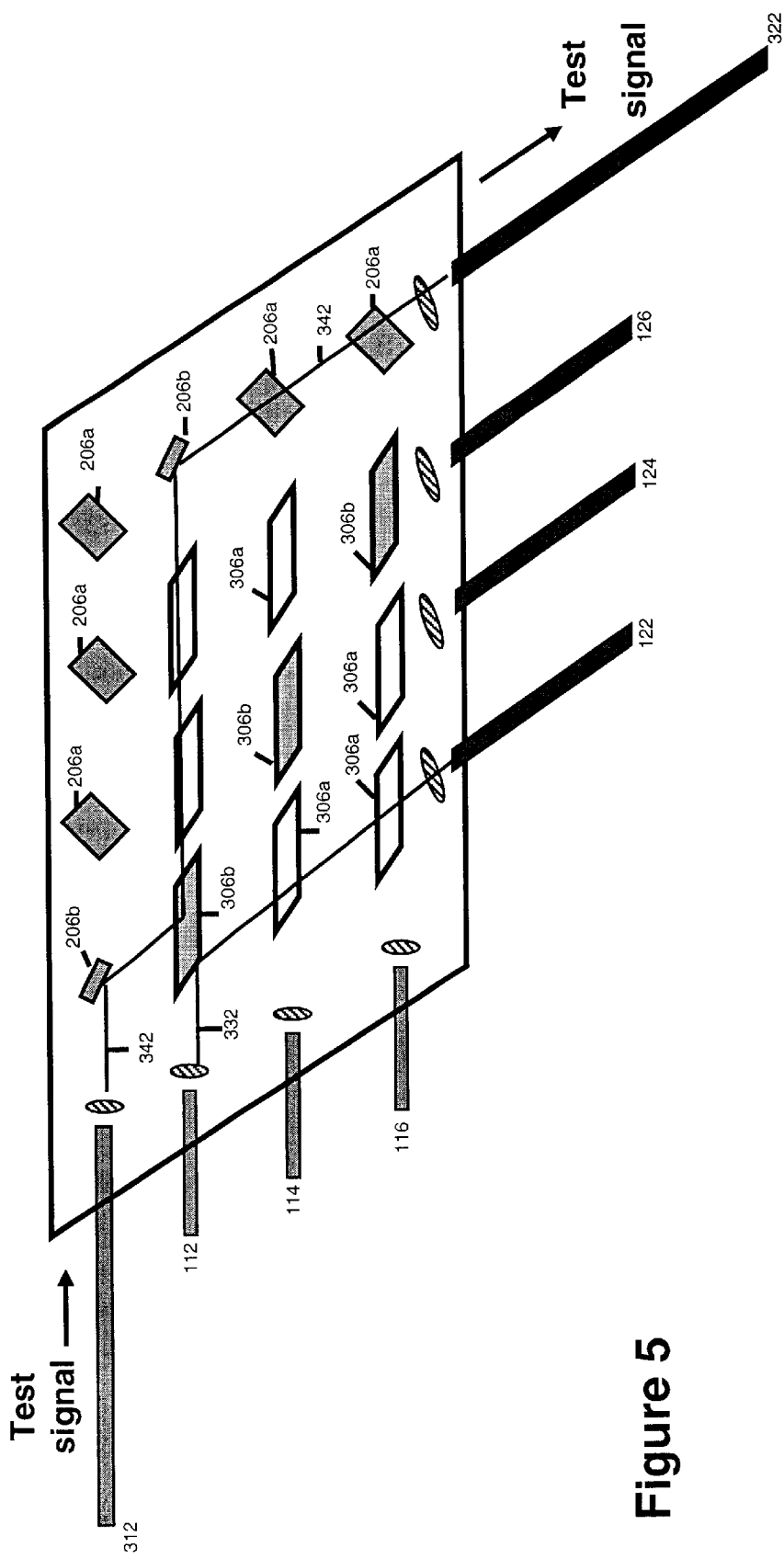
FIG. 5 shows a configuration of a photonic switch according to a third embodiment of the present invention.

Whilst the photonic switches have hitherto been described as reflective devices, it will be appreciated by a skilled person that equally a beam could be redirected (and hence switched) by using a refractive medium, and that the present invention could be utilised to verify the operation of such a switch. FIG. 5 shows the operation of a 3×3 switch utilising appropriately shaped refractive medium to direct optical signals from the inputs 112, 114 & 116 to the outputs 122, 124 & 126 as desired. Each of the refractive medium 306 may be either in a position 306b to redirect a signal from an input 112, 114, 116 to an appropriate output 122, 124 & 126, or may be in a position 306a to allow a signal from an input 112,114,116 to pass over the medium uninterrupted.

As in FIGS. 4a and 4b, a test signal is provided by a separate test input 312, and arranged to be detected at a separate test signal output 322. In this embodiment, mirrors 206 are again used to direct the test signal beam path as appropriate, although it would be appreciated that equally refractive medium could alternatively be utilised.

As shown in FIG. 5, a transmission signal 332 from input 112 is refracted by a switching means 306b to the output 122. Operation of this switching means is verified by providing a test signal 342 from input 312, the test signal reflecting of the surface of a first raised mirror 206b, undergoing refraction from the appropriately angled medium 306b, and subsequently redirected to reflect off a further test switching mirror 206b and hence into the output 322 for subsequent detection. As previously, operation of either of the switching means 306 can be verified by appropriately raising and lowering the test mirrors 206.

For the purposes of this specification, the terms "optical" and "light" should be understood as pertaining not only to the visible part of the electro magnetic spectrum, but also to the infra-red and ultra-violet parts that bound the visible part.

Any range or device given herein may be extended or altered without losing the effect sought, as will be apparent to a skilled person from an understanding of the teaching herein.

What is claimed is:

1. A method of testing the operation of a photonic switch, said switch comprising switching means arranged to be movable between at least a first and a second position, and arranged to switch an incident optical signal by redirection of the optical path of said signal, the method comprising the steps of:

providing a test optical signal arranged to be incident once only upon said switching means when in said first position, along a path distinct from the switched optical signal path, said test optical signal path being distinct from said switched optical signal path over a section of said test optical signal path immediately prior to where the test optical signal is incident on the switching means; and measuring the test signal at a predetermined position suitable for determining from the measuring if said switching means is in said first position.

2. A method as claimed in claim 1, further including the step of the switching means, when in said first position, redirecting the test optical signal.

3. A method as claimed in claim 1, wherein said redirection occurs as a consequence of at least one of reflection and refraction.

4. A method as claimed in claim 1, wherein said switch comprises a plurality of said switching means, the method steps each being performed a predetermined number of times.

5. A method as claimed in claim 4, wherein said method steps are sequentially repeated.

6. A method as claimed in claim 5, wherein said method steps are performed prior to the switch being utilised to switch live optical signals, the method further comprising the step of sequentially switching said switching means between said first and said second position.

7. A method according to claim 4, wherein said switch further comprises a plurality of further switching means arranged to switch a test optical signal along a plurality of paths, each path being incident upon a switching means when in said first position, the method further comprising the step of utilising said further switching means to sequentially provide a test optical signal incident upon the switching means in a predetermined sequence.

8. A method as claimed in claim 7, wherein said method steps are performed while said switch is carrying live optical signals.

9. A computer programme arranged to perform a method of testing the operation of a photonic switch, said switch comprising switching means arranged to be movable between at least a first and a second position, and arranged to switch an incident optical signal by redirection of the optical path of said signal the method comprising the steps of providing a test optical signal arranged to be incident once only upon said switching mean when in said first position, along a path distinct from the switched optical signal path, said test optical signal path being distinct from said switched optical signal path over a section of said test optical signal path immediately prior to where the test optical signal is incident on the switching means; and measuring the test signal at a predetermined position suitable for determining if said switching means is in said first position from the measurement.

10. A computer programme according to claim 9, wherein said computer programme is stored on a machine readable medium.

11. A photonic switch comprising switching means arranged to be moveable between at least a first and a second position, and arranged to switch an incident optical signal by redirection of the optical path of said signal, the switch further comprising means to provide a test optical signal incident once only upon said switching means when in said first position along a path distinct from the switched optical signal, said test optical signal path being distinct from said switched optical signal path over a section of said test optical signal path immediately prior to where the test optical signal is incident on the switching means, and output means suitable for providing an output for measuring the test signal at a predetermined position suitable for determining if said switching means is in said first position from said measurement.

12. A switch according to claim 11, wherein said output means comprises an output port suitable for connection to an optical power meter.

13. A switch according to claim 11, wherein said switching means has a first reflective surface for redirection of said incident optical signal.

14. A switch according to claim 13, wherein said switching means further comprises a second reflective surface arranged to redirect an incident test optical signal along an optical path to said output.

15. A switch as claimed in claim 14, wherein said first and second reflective surfaces are substantially parallel.

16. A switch according to claim 11, comprising N inputs for providing input optical signals to be switched, M outputs for output of switched signals, and an array of N×M switching means for switching said optical signals.

17. A switch as claimed in claim 16, wherein one of said inputs is arranged to provide a test optical signal, and one of said outputs is arranged to receive said test optical signal.

18. A switch as claimed in claim 16, further comprising an additional input for providing said test signal, an additional output for receiving said output test signal, and an additional row and column of switching means for directing said test signal.

19. A switch as claimed in claim 11, further comprising control means arranged to perform a method comprising the steps of providing a test optical signal arranged to be incident upon said switching means when in said first position, along a path distinct from the switched optical signal path; and measuring the test signal at a predetermined position suitable for determining if said switching means is in said first position from the measurement.

20. A telecommunication system comprising a photonic switch comprising switching means arranged to be moveable to at least a first and a second position, and arranged to switch an incident optical signal by redirection of the optical path of said signal, the switch further comprising means to provide a test optical signal incident once only upon said switching means when in said first position along a path distinct from the switched optical signal, said test optical signal path being distinct from said switched optical signal path over a section of said test optical signal path immediately prior to where the test optical signal is incident on the switching means, and output means suitable for providing an output for measuring the test signal at a predetermined position suitable for determining if said switching means is in said first position from said measurement.

* * * * *